US 8,232,943 B2

(12) United States Patent
Park (10) Patent No.: US 8,232,943 B2
(45) Date of Patent: *Jul. 31, 2012

(54) LIQUID CRYSTAL DISPLAY DEVICE

(75) Inventor: Chang Keun Park, Daegu (KR)

(73) Assignee: LG Display Co., Ltd., Seoul (KR)

( * ) Notice: Subject to any disclaimer, the term of this patent is extended or adjusted under 35 U.S.C. 154(b) by 1325 days.

This patent is subject to a terminal disclaimer.

(21) Appl. No.: 11/819,729

(22) Filed: Jun. 28, 2007

(65) Prior Publication Data

US 2008/0150871 A1    Jun. 26, 2008

(30) Foreign Application Priority Data

Dec. 20, 2006 (KR) .................. 10-2006-0130763
Apr. 19, 2007 (KR) .................. 10-2007-0038226

(51) Int. Cl.
*G09G 3/36* (2006.01)
*G09G 5/00* (2006.01)
*G09G 5/10* (2006.01)

(52) U.S. Cl. ............ 345/88; 345/87; 345/98; 345/100; 345/211; 345/204; 345/205; 345/690

(58) Field of Classification Search ............ 345/87–102, 345/204, 205, 211, 690, 208–210
See application file for complete search history.

(56) References Cited

U.S. PATENT DOCUMENTS

| | | | | |
|---|---|---|---|---|
| 5,414,443 A | * | 5/1995 | Kanatani et al. | 345/95 |
| 5,745,093 A | * | 4/1998 | Tsuzuki et al. | 345/103 |
| 6,184,853 B1 | * | 2/2001 | Hebiguchi et al. | 345/88 |
| 6,249,326 B1 | * | 6/2001 | Hebiguchi | 349/42 |
| 6,552,707 B1 | * | 4/2003 | Fujiyoshi | 345/98 |
| 7,804,473 B2 | * | 9/2010 | Kumeta | 345/96 |
| 2003/0151584 A1 | * | 8/2003 | Song et al. | 345/100 |
| 2003/0189537 A1 | * | 10/2003 | Yun | 345/87 |
| 2003/0197668 A1 | * | 10/2003 | Song et al. | 345/87 |

(Continued)

FOREIGN PATENT DOCUMENTS

CN    01132848 A    7/2001

(Continued)

OTHER PUBLICATIONS

Office Action issued Mar. 1, 2010 in corresponding Chinese Application No. 200710139727.8.

(Continued)

*Primary Examiner* — Lun-Yi Lao
*Assistant Examiner* — Jarurat Suteerawongsa
(74) *Attorney, Agent, or Firm* — Morgan, Lewis & Bockius LLP (57) ABSTRACT

A liquid crystal display device includes pixel cells that can be dot-inverted by a row-inversion driving scheme. According to an embodiment of the invention, a liquid crystal display device includes a first data line, a second data line, a first gate line, a second gate line, a third gate line, at least three of the sub-pixels arranged immediately adjacent along one of the data lines and corresponding to different colors to form a pixel, and a driving integrated circuit for sequentially driving the first, second and third gate lines in a horizontal period. During the horizontal period, a first signal supplied to a first sub-pixel of the pixel has a polarity opposite from a second signal supplied to a second sub-pixel of the pixel and the same as a third signal supplied to a third sub-pixel of the pixel.

4 Claims, 5 Drawing Sheets

U.S. PATENT DOCUMENTS

| | | | |
|---|---|---|---|
| 2004/0095342 A1* | 5/2004 | Lee et al. | 345/211 |
| 2005/0046774 A1 | 3/2005 | Choi et al. | |
| 2006/0139281 A1* | 6/2006 | Park | 345/96 |
| 2007/0091044 A1* | 4/2007 | Park et al. | 345/88 |
| 2007/0146269 A1* | 6/2007 | Hoshino | 345/88 |
| 2007/0165149 A1 | 7/2007 | Kim et al. | |
| 2008/0150871 A1* | 6/2008 | Park | 345/98 |
| 2008/0186421 A1* | 8/2008 | Park | 349/37 |

FOREIGN PATENT DOCUMENTS

| | | |
|---|---|---|
| CN | 1338719 | 3/2002 |
| CN | 1561469 A | 1/2005 |
| CN | 101004520 A | 8/2006 |
| GB | 2 383 462 A | 6/2003 |
| KR | 10-2003-0039972 | 5/2003 |
| KR | 10-2004-0110694 | 12/2004 |
| TW | 594321 | 6/2004 |
| TW | 2005-35463 | 11/2005 |

OTHER PUBLICATIONS

Taiwanese Office Action dated Feb. 16, 2012, with English translation.

* cited by examiner

FIG. 5

LIQUID CRYSTAL DISPLAY DEVICE

The invention claims the benefit of Korean Patent Application Nos. 10-2006-0130763 filed in Korea on Dec. 20, 2006, and 10-2007-0038226 filed in Korea on Apr. 19, 2007, both of which are hereby incorporated by reference in their entirety.

BACKGROUND OF THE INVENTION

1. Field of the Invention

Embodiments of the invention relate to a liquid crystal display device, and more particularly, to a liquid crystal display device that can reduce a production cost and power consumption by reducing the number of data lines.

2. Discussion of the Related Art

A liquid crystal display (LCD) device controls an optical transmission ratio of liquid crystal molecules using an electric field to thereby display an image. In general, an LCD device is provided with a liquid crystal panel having liquid crystals between two glass substrates, a matrix of liquid crystal cells, and switching devices for respectively changing signals in the liquid crystal cells, a driving circuit for driving the liquid crystal panel, and a backlight unit for directing light onto the liquid crystal panel.

Recently, the number of signal lines or the number of circuit components of the liquid crystal panel are reduced to develop a thin and light, as well as low cost liquid crystal display device. For example, Korean Patent Publication No. 10-2003-0039972 discloses an on-glass single-chip liquid crystal display device in which one integrated driving chip for driving an LCD panel is mounted on the circumference of display area to reduce the panel size and the production cost of device.

The on-glass single-chip liquid crystal display device according to related art has the following disadvantages. Color pixel cells in a unit pixel have vertical stripe structures such that the color pixel cells are arranged along a horizontal direction (a gate line direction) of the liquid crystal display panel. Each of the color pixels cells requires an individual data line. Because the integrated driving chip increases in size as the number of data lines increases, only a small size liquid crystal display device, such as resolution of 360×160, can utilize an on-glass single-chip liquid crystal display device. To obtain higher resolution devises, the on-glass single-chip liquid crystal display device requires an additional circuit, such as a selection circuit, to decrease the number of data lines. When using a selection circuit, analog pixel data is divided in accordance with a time division during an active period of gate line, and is then supplied to the plurality of data lines such that charging time of pixel data is decreased. Thus, the resolution of LCD panel is limited by the charging time of pixel data when a selection circuit is used. Further, the analog pixel data outputted from each channel of an integrated driving chip is inverted alternately for each horizontal line, which consumes a large amount of power.

SUMMARY OF THE INVENTION

Accordingly, embodiments of the invention are directed to a liquid crystal display device that substantially obviates one or more of the problems due to limitations and disadvantages of the related art.

An object of the embodiments of the invention is to provide a liquid crystal display device that can reduce a production cost and power consumption by reducing the number of data lines.

Another object of the embodiments of the invention is to provide a liquid crystal display device having improved picture quality.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a liquid crystal display device includes a plurality of data lines including a first data line and a second data line arranged substantially parallel to each other, a plurality of gate lines including a first gate line, a second gate line and a third gate line arranged substantially parallel to one another, the gate lines crossing the data lines, a plurality of sub-pixels defined by the crossing the gate lines and the data lines, at least three of the sub-pixels arranged immediately adjacent along one of the data lines and corresponding to different colors to form a pixel, and a driving integrated circuit for sequentially driving the first, second and third gate lines in a horizontal period, wherein during the horizontal period, a first signal supplied to a first sub-pixel of the pixel has a polarity opposite from a second signal supplied to a second sub-pixel of the pixel and the same as a third signal supplied to a third sub-pixel of the pixel.

In another aspect, a method of driving a liquid crystal display device having a plurality of data lines, a plurality of gate lines, and a plurality of pixels defined by crossing of the data and gate lines, each pixel including three sub-pixels arranged immediately adjacent along one of the data lines, includes sequentially driving three of the gate lines during each horizontal period of a first frame, supplying video signals of a first polarity to odd-numbered of the data lines during the first frame, and supplying video signals of a second polarity to even-numbered of the data lines in the first frame, wherein in the horizontal period and in each of the pixels, a first signal supplied to a first sub-pixel has a polarity opposite from a second signal supplied to a second sub-pixel and the same as a third signal supplied to a third sub-pixel.

In another aspect, a liquid crystal display device includes m gate lines, m being an integer greater than three, n data lines, n being an integer greater than two, and a plurality of first-color sub-pixels arranged along between an $i^{th}$ gate line and an $(i+1)^{th}$ gate line, a plurality of second-color sub-pixels arranged along between the $(i+1)^{th}$ gate line and an $(i+2)^{th}$ gate line, and a plurality of third-color sub-pixels arranged along between the $(i+2)^{th}$ gate line and an $(i+3)^{th}$ gate line, wherein the first-color sub-pixels and the third-color sub-pixels are connected to one of first to $(n-1)^{th}$ of the data lines, and the second-color sub-pixels are connected to second to $n^{th}$ of the data lines.

In another aspect, a liquid crystal display device includes m gate lines, m being an integer greater than six, n data lines, n being an integer greater than two, and a plurality of first sub-pixels sequentially arranged between an $i^{th}$ gate line and an $(i+1)^{th}$ gate line, a plurality of second sub-pixels sequentially arranged between the $(i+1)^{th}$ gate line and an $(i+2)^{th}$ gate line, a plurality of third sub-pixels sequentially arranged between the $(i+2)^{th}$ gate line and an $(i+3)^{th}$ gate line, a plurality of four sub-pixels sequentially arranged between the $(i+3)^{th}$ gate line and an $(i+4)^{th}$ gate line, a plurality of fifth sub-pixels sequentially arranged between the $(i+4)^{th}$ gate line and an $(i+5)^{th}$ gate line, a plurality of sixth sub-pixels sequentially arranged between the $(i+5)^{th}$ gate line and an $(i+6)^{th}$ gate line, wherein the first sub-pixels, the second sub-pixels, the fifth sub-pixels and sixth sub-pixels are connected to one of first to $(n-1)^{th}$ of the data lines, and the third sub-pixels and fourth sub-pixels are connected to second to $n^{th}$ of the data lines, and wherein the first sub-pixels and the fourth sub-pixels include first-color sub-pixels, the second sub-pixels and the fifth sub-pixels include second-color sub-pixels, and the third sub-pixels and the sixth sub-pixels include third-color sub-pixels.

In another aspect, a liquid crystal display device includes a liquid crystal panel having a plurality of pixel cells formed in regions defined by m+1 data lines and n gate lines having three colors arranged repeatedly in the data line direction and the same colors arranged in the gate line direction, a gate built-in circuit supplying gate-on voltages to the gate lines formed in the liquid crystal panel, a driving integrated circuit, formed in the liquid crystal panel, driving the gate built-in circuit and supplying video signals inverted in a data line unit and a frame unit to the data lines, and a flexible printed circuit connecting the liquid crystal panel to an external driving system.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention. In the drawings.

DETAILED DESCRIPTION OF THE PREFERRED EMBODIMENTS

Reference will now be made in detail to the preferred embodiments of the invention, examples of which are illustrated in the accompanying drawings.

Figure 1:
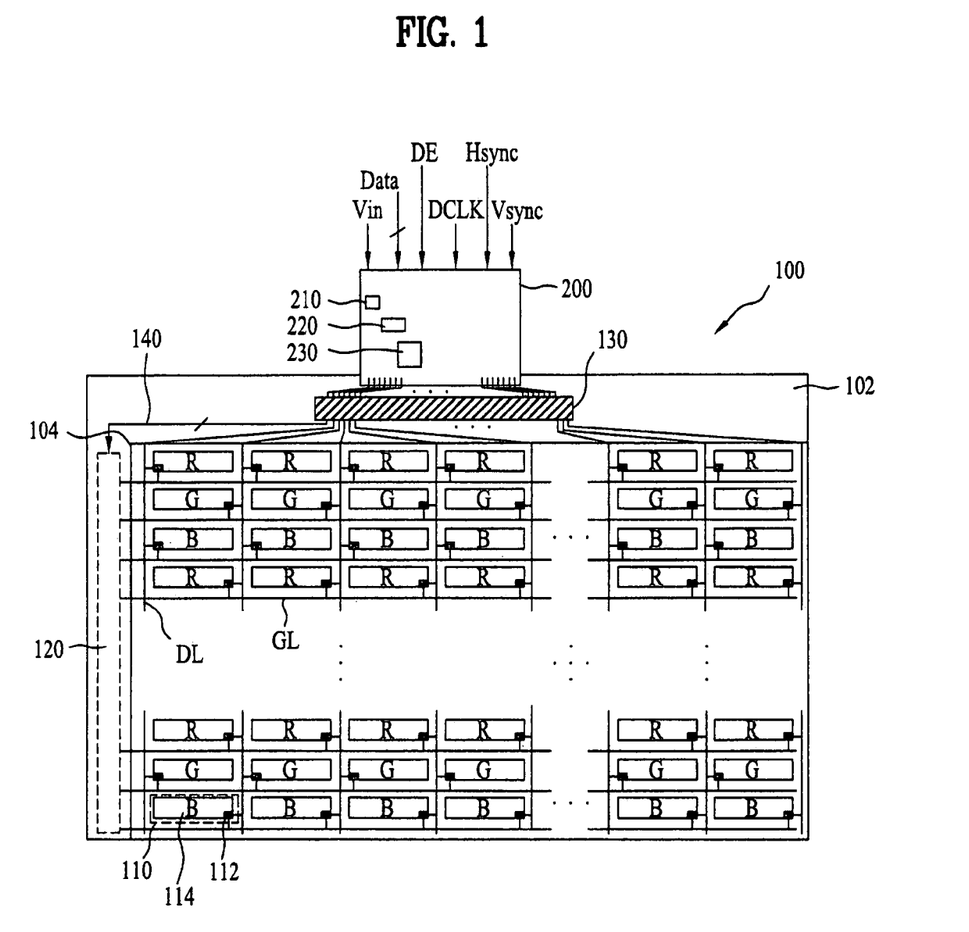
FIG. 1 is a schematic diagram illustrating a liquid crystal display device in accordance with a first embodiment of the invention.

FIG. 1 is a schematic diagram illustrating a liquid crystal display device in accordance with a first embodiment of the invention. In FIG. 1, a liquid crystal display device includes a liquid crystal panel 100 having a plurality of pixel cells 110 defined by the crossing of a plurality of data lines DL and gate lines GL. The pixel cells 110 include three colors alternatively arranged along the data line direction or a vertical direction and the same colors arranged along the gate line direction or a horizontal direction.

A gate built-in circuit 120 is built-in the liquid crystal panel 100 for driving the gate lines GL, and a driving integrated circuit 130 is mounted to the liquid crystal panel 100 both for driving the gate built-in circuit 120 and supplying video signals to the data lines DL. A flexible printed circuit 200 is attached to the liquid crystal panel 100 for connecting the liquid crystal panel 100 to an external driving system (not shown).

The liquid crystal panel 100 includes a lower substrate 102 and an upper substrate 104 bonded facing each other, spacers (not shown) for maintaining a constant cell gap between the lower and upper substrates 102 and 104, and a liquid crystal layer (not shown) filled in a liquid crystal space provided by the spacers.

The lower substrate 102 includes a display region in correspondence to the upper substrate 104 and a non-display region excluding the display region. In the display region of the lower substrate 102, there are the plurality of data lines DL formed at predetermined intervals parallel to each other along a first direction, the plurality of gate lines GL formed at predetermined intervals parallel to each other along a second direction, and the pixel cells 110 formed at every regions defined by the plurality of data lines DL and gate lines GL. The first direction may be perpendicular to the second direction. A number of the data lines DL which supply the video signals are smaller than a number of the gate lines GL which supply a gate-on voltage.

Each of the pixel cells 110 includes a thin film transistor 112 connected both to the gate line GL and the data line DL, and a pixel electrode 114 connected to the thin film transistor 112. Each of the thin film transistor 112 includes a gate electrode connected to the gate line GL, a source electrode connected to the data line DL, and a drain electrode connected to the pixel electrode 114. The thin film transistors 112 are arranged along the data lines DL on opposite sides thereof alternately. That is, the thin film transistors 112 for two vertically adjacent pixel cells 110 are connected to different data lines DL. Accordingly, the thin film transistors 112 connected to odd-numbered gate lines GL2n−1 supply video signals from a first to $(m)^{th}$ data lines DL1~DLm to respective pixel electrodes 114, and the thin film transistors 112 connected to even-numbered gate lines GL2n supply video signals from a second to $(m+1)^{th}$ data lines DL2~DLm+1 to respective pixel electrodes 114. The pixel electrode 114 has a short side parallel to the data line DL formed shorter than a long side parallel to the gate line GL. Accordingly, the pixel electrodes 114 form horizontal stripes.

In the non-display region of the lower substrate 102, there are the gate built-in circuit 120 connected to each of the plurality of the gate lines GL, and the driving integrated circuit 130 mounted thereto. The upper substrate 104 includes color filters, a common electrode and a light shielding layer. The common electrode may be formed on the lower substrate 102 depending on the liquid crystals of the liquid crystal layer. The color filters are formed to include a red R color filter, a green G color filter, and a blue B color filter are alternatively arranged along the data line DL direction, and color filters of the same color are arranged along the gate line GL direction.

The common electrode may be formed throughout the upper substrate 104 or in shapes of lines opposite to the pixel electrodes 114 for forming a vertical electric field across the liquid crystal layer. Alternatively, the common electrode may be formed on the lower substrate 102 parallel to the pixel electrodes 114 for forming a horizontal electric field across the liquid crystal layer.

The light shielding layer is formed on the upper substrate 104 to overlap regions excluding aperture regions overlapping the pixel electrodes 114. Each of a red R, a green G, and a blue B pixel cells respectively on the red R color filter, the green G color filter, and the blue B color filter is a unit pixel of one color picture.

The flexible printed circuit 200 is provided to the non-display region of the lower substrate 102 and attached to a pad portion of the lower substrate 102. The flexible printed circuit 200 transmits an input power Vin, a source data signal Data, and synchronizing signals DE, DCLK, Hsync, and Vsync from a driving system to the driving integrated circuit 130. In addition, the flexible printed circuit 200 may include passive elements, such as a resistor 210, a capacitor 220 and an inductor 230, mounted thereto.

The driving integrated circuit 130 is mounted to an integrated circuit mounting portion having a plurality of input/output pads at the non-display region of the lower substrate 102. The driving integrated circuit 130 may include a plurality of input/output bumps to be electrically connected to the input/output pads at the integrated circuit mounting portion, respectively. In addition, the driving integrated circuit 130 generates a gate driving signal and a data control signal. The driving integrated circuit 130 divides one horizontal period corresponding to one period of the horizontal synchronizing signal Hsync into first to third subperiods by using at least one of the synchronizing signals DE, DCLK, Hsync, and Vsync from the flexible printed circuit 200. Also, the driving integrated circuit 130 aligns the source data signals Data in red data R, green data G, and blue data B corresponding to the first to third subperiods, converts the red data R, green data G, and blue data B into video signals which are analogous, and supplies the video signals to the data lines DL.

Figure 2:
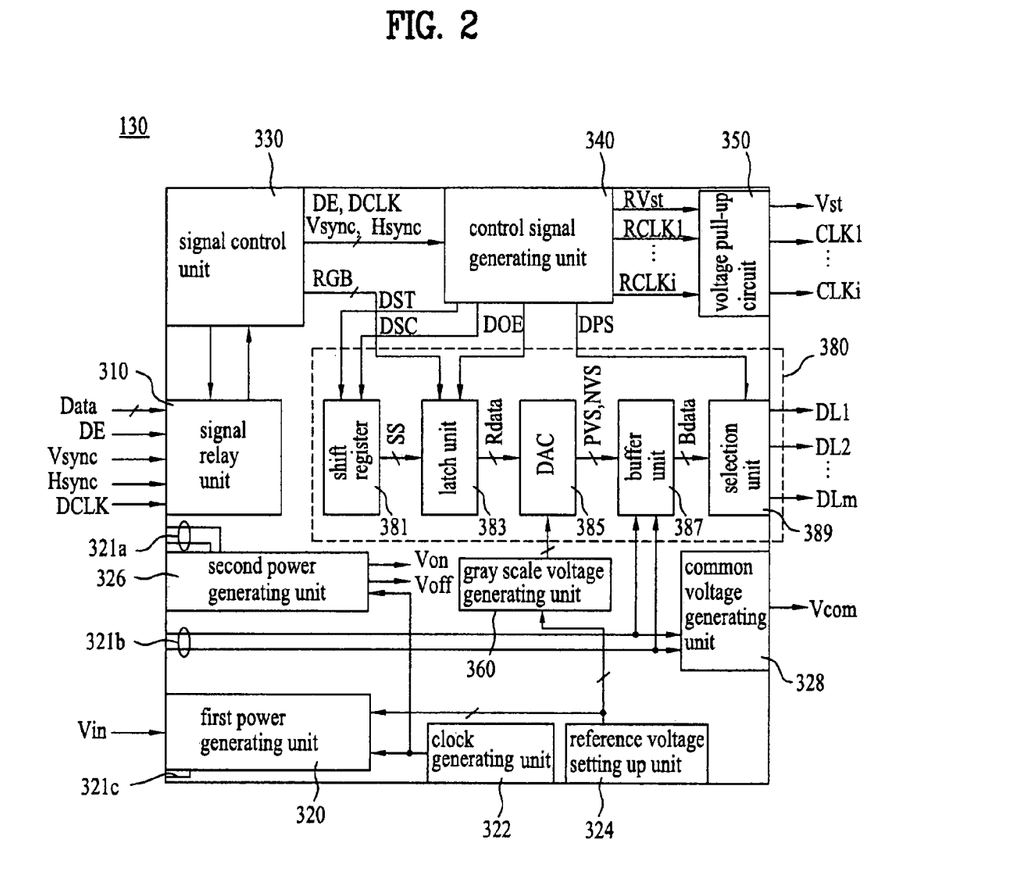
FIG. 2 is a schematic block diagram illustrating the driving integrated circuit shown in FIG. 1.

FIG. 2 is a schematic block diagram illustrating the driving integrated circuit shown in FIG. 1. Referring to FIG. 2, the driving integrated circuit 130 includes a signal relay unit 310, a first power generating unit 320, a clock generating unit 322, a reference voltage setting up unit 324, and a second power generating unit 326. The driving integrated circuit 130 also includes a common voltage generating unit 328, a signal control unit 330, a control signal generating unit 340, a voltage pull-up circuit 350, a gray scale voltage generating unit 360, and a data converting unit 380. The signal relay unit 310 relays the source data signal Data and the synchronizing signals DE, DCLK, Hsync, and Vsync from the flexible printed circuit 200 (shown in FIG. 1) into the signal control unit 330. The signal control unit 330 controls driving of the signal relay unit 310, and other circuits in the driving integrated circuit 130.

The clock generating unit 322 generates clock for driving the first and second power generating units 320 and 326. The first power generating unit 320 generates a first power, i.e., first and second reference voltages VSP and VSN by using an input power Vin from the flexible printed circuit 200 (shown in FIG. 1) in accordance with the clock from the clock generating unit 322. In addition, the passive elements, such as the resistor 210, the capacitor 220 and the inductor 230 on the flexible printed circuit 200 (shown in FIG. 1) are connected to the first power generating unit 320 through power signal lines 321a, 321b, and 321c, and used for biasing the first and second reference voltages VSP and VSN generated at the first power generating unit 320 or setting up option functions of the driving integrated circuit 130.

The second power generating unit 326 generates a second power, i.e., first and second driving voltages Vdd and Vss, an integrated circuit driving voltage Vcc, a gate-ON voltage Von and a gate off voltage Voff, required for driving the liquid crystal panel 100 by using the first and second reference voltages VSP and VSN generated at the first power generating unit 320.

The reference voltage setting up unit 324 sets up levels of the first and second reference voltages VSP and VSN to be supplied to the gray scale voltage generating unit 360 from the first power generating unit 320. The common voltage generating unit 328 generates a common voltage Vcom to be supplied to the common electrode of the liquid crystal panel 100 by using the first and second driving voltages Vdd and Vss supplied to the passive elements on the flexible printed circuit 200 from the second power generating unit 326. The flexible printed circuit 200 includes a common voltage varying unit (not shown) for varying the common voltage Vcom generated at the common voltage generating unit 328 by using at least one of a resistor and a capacitor (not shown).

The signal control unit 330 supplies the synchronizing signals DE, DCLK, Hsync, and Vsync from the signal relay unit 310 to the control signal generating unit 340. The control signal generating unit 340 generates data control signals DST, DSC, DOE, and DPS, and gate driving signals RVst, and RCLK1 to RCLKi by using at least one of the synchronizing signals DE, DCLK, Hsync, and Vsync from the signal control unit 330. The data converting unit 380 includes a shift register 381, a latch unit 383, a digital/analog converting unit 385, a buffer unit 387, and a selection unit 389.

Figure 3:
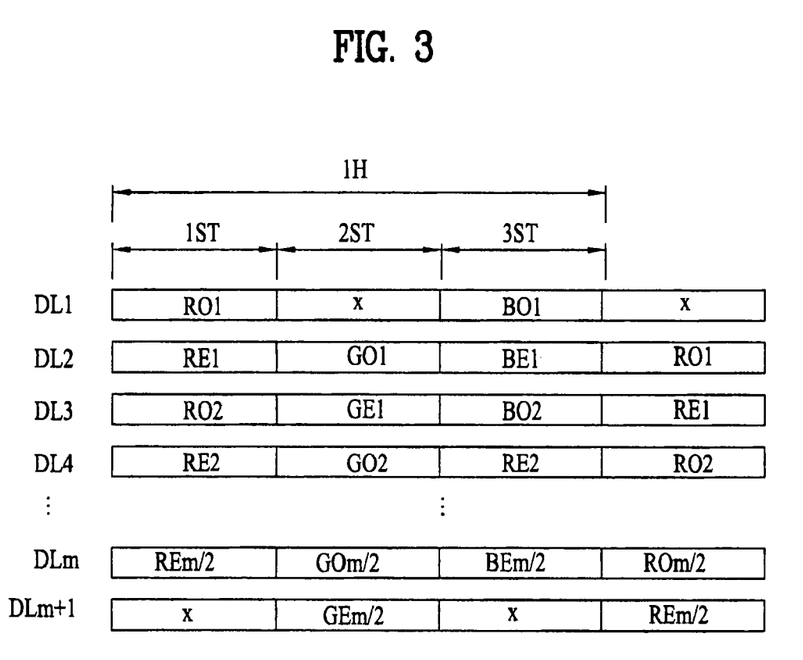
FIG. 3 is a schematic diagram illustrating data signals sorted by the signal control unit shown in FIG. 2.

FIG. 3 is a schematic diagram illustrating data signals sorted by the signal control unit shown in FIG. 2. Referring to FIG. 3, the signal control unit 330 also aligns the source data signals from the signal relay unit 310 for driving the liquid crystal panel 100, and supplies the aligned data to the data converting unit 380. In particular, the signal control unit 330 aligns one horizontal period of the source data signal from the signal relay unit 310 into red data R, green data G, and blue data B to correspond to the first to third subperiods 1ST, 2ST and 3ST.

The signal control unit 330 realigns the red data R aligned thus into odd-numbered red data RO1 to ROm/2 to be supplied to odd-numbered data lines DL1, DL3 . . . DLm−1, and even-numbered red data RE1 to REm/2 to be supplied to even-numbered data lines DL2, DL4 . . . DLm among first to (m)$^{th}$ data lines DL1 to DLm during the first subperiod 1ST of the one horizontal period. Then, the signal control unit 330 realigns the green data G aligned thus into odd-numbered green data GO1 to GOm/2 to be supplied to even-numbered data lines DL2, DL4 . . . DLm, and even-numbered green data GE1 to GEm/2 to be supplied to odd-numbered data lines DL3, DL5 . . . DLm+1 among second to (m+1)$^{th}$ data lines DL2 to DLm+1 during the second subperiod 2ST of the one horizontal period. Similarly, the signal control unit 330 realigns the blue data B realigned thus into odd-numbered blue data BO1 to BOm/2 to be supplied to odd-numbered data lines DL1, DL3 . . . DLm−1, and even-numbered blue data BE1 to BEm/2 to be supplied to even-numbered data lines DL2, DL4 . . . DLm among first to (m)$^{th}$ data lines DL1 to DLm during the third subperiod 3ST of the one horizontal period.

The signal control unit 330 also supplies the synchronizing signals DE, DCLK, Hsync, and Vsync to the control signal generating unit 340 outputted from the signal relay unit 310. The control signal generating unit 340 generates data control signals DST, DSC, DOE, and DPS, and gate driving signals RVst, and RCLK1 to RCLKi by using at least one of the synchronizing signals DE, DCLK, Hsync, and Vsync outputted from the signal control unit 330. The data control signal DST, DSC, DOE, and DPS includes a data start signal DST, a data shift clock DSC, a data output signal DOE, and a data polarity signal DPS for controlling the data converting unit 380. The control signal generating unit 340 supplies video signals of different polarities to adjacent data lines DL, and generates a data polarity signal for inverting the polarities of the video signals supplied to the data lines DL in at least one of the frame units. The control signal generating unit 340 generates a column inversion type of data polarity signal DSP which inverts the polarities of the video signals in the data line unit and in at least one of the frame units.

The gate driving signal RVst, and RCLK1 to RCLKi includes a gate start signal RVst and first to $(i)^{th}$ clock signals RCLK1 to RCLKi for driving the gate built-in circuit 120. The first to $(i)^{th}$ clock signals RCLK1 to RCLKi have phases delayed in sequence so that the first to $(i)^{th}$ clock signals RCLK1 to RCLKi are made to have pulse widths for turning on the thin film transistors in each of the subperiods, respectively. The first to $(i)^{th}$ clock signals RCLK1 to RCLKi may have any one of two, four, six, eight, or ten phases depending on the gate built-in circuit 120.

The voltage pull-up circuit 350 pulls up voltage levels of the gate driving signals RVst, and RCLK1 to RCLKi supplied from the control signal generating unit 340 by using the gate-ON voltage Von and the gate off voltage Voff supplied from the second power generating unit 326. The gate-ON voltage Von is a voltage for turning on the thin film transistor 112 of each cell 110, and the gate off voltage Voff is a voltage for turning off the thin film transistor 112 of each cell 110. The voltage pull-up circuit 350 supplies the gate driving signals Vst, and CLK1 to CLKi pulled up through a gate driving signal transmission line 140 at the non-display region of the lower substrate 102 to the gate built-in circuit 120.

The gray scale voltage generating unit 360 subdivides the first and second reference voltages VSP and VSN from the first power generating unit 320, to generate a plurality of gray scale voltages and supplies the plurality of gray scale voltages to the data converting unit 380. The plurality of gray scale voltages generates $2^N$ positive polarity gray scale voltages and $2^N$ negative polarity gray scale voltages if the source data signal Data has N bits.

The shift register 381 shifts the data start signal DST in sequence in accordance with the data shift clock DSC from the control signal generating unit 340, to generate a shift signal SS. The shift register 381 may be bidirectional shift register which is driven in opposite directions in accordance with a directional signal from the signal control unit 380.

The latch unit 383 latches a data RGB of one line amount from the signal control unit 330 in sequence in response to the shift signal SS from the shift register 381, and supplies a data RData of one line amount latched according to the data output signal DOE from the control signal generating unit 340 to the digital/analog converting unit 385.

The digital/analog converting unit 385 converts the latched data RData supplied from the latch unit 383 into positive polarity and negative polarity video signals PVS and NVS by using the plurality of positive polarity gray scale voltages and negative polarity gray scale voltages from the gray scale voltage generating unit 360. The digital/analog converting unit 385 selects one gray scale voltage corresponding to a gray scale value of the latched data RData from the plurality of positive polarity gray scale voltages as a positive polarity video signal PVS, and one gray scale voltage corresponding to a gray scale value of the latch data RData from the plurality of negative polarity gray scale voltages as a negative polarity video signal.

The buffer unit 387 buffers the positive polarity and negative polarity video signals PVS and NVS by using first and second driving voltages Vdd and Vss from the first power generating unit 320 through the passive elements of the flexible printed circuit 200. For example, the buffer unit 387 amplifies the positive polarity and negative polarity video signals PVS and NVS taking a load on the data line DL into account.

The selection unit 389 selects the positive polarity or the negative polarity video signal PVS or NVS supplied from the buffer unit 387 according to the data polarity signal DPS from the control signal generating unit 340, and supplies the selected video signal to the data lines DL through first to $(m+1)^{th}$ output channels. For example, the polarity of the video signal outputted from the selection unit 389 is inverted in the output channel unit and in the frame unit according to the data polarity signal DPS.

Referring back to FIG. 1, the gate built-in circuit 120 is formed at the non-display region of the lower substrate 102 together with a process for forming the thin film transistors 112 and the gate built-in circuit 120 is connected to the plurality of gate lines GL, respectively. The gate built-in circuit 120 generates the gate-ON voltage Von at every subperiod in response to pulled up gate driving signals Vst, and CLK1 to CLKi supplied from the driving integrated circuit 130, and supplies the gate-ON voltage Von to the gate lines GL in sequence. For example, the driving integrated circuit 130 supplies the pulled up gate driving signals Vst, and CLK1 to CLKi to the gate built-in circuit 120 through the plurality of gate driving signal transmission lines 140 formed at the non-display region of the lower substrate 102.

Figure 4:
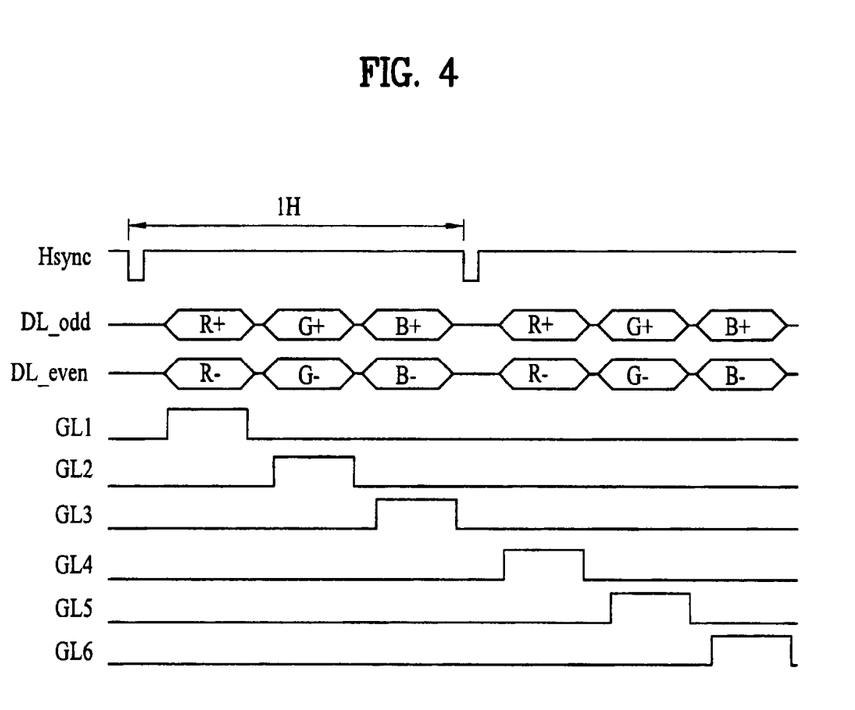
FIG. 4 is a schematic diagram illustrating driving waveforms for the liquid crystal display device in accordance with a first embodiment of the invention.

FIG. 4 is a schematic diagram illustrating driving waveforms for the liquid crystal display device in accordance with a first embodiment of the invention. Exemplary driving of the liquid crystal display device in accordance with a first embodiment of the invention will be described with reference to FIG. 4 in association with FIG. 1. For example, the first horizontal period is subdivided into the first to third subperiods, and the red, green, and blue videos are displayed at the subperiods in sequence to mix the red, green, and blue videos to collectively display one color video.

At the first subperiod of the first horizontal period, in synchronization to supply of the gate-ON voltage Von to the first gate line GL1, of the first to $(m)^{th}$ data lines DL1 to DLm, a positive polarity red video signal R+ is supplied to odd-numbered data lines DL_odd and a negative polarity red video signal R− is supplied to even-numbered data lines DL_even. Accordingly, of the pixel cells 110 in the first horizontal line, odd-numbered pixel cells 110 display red video corresponding to the positive polarity red video signal R+ and the even-numbered pixel cells 110 displays red video corresponding to the negative polarity red video signal R−.

At the second subperiod of the first horizontal period, in synchronization to supply of the gate-ON voltage Von to the second gate line GL2, of the second to $(m+1)^{th}$ data lines DL2 to DLm+1, a positive polarity green video signal G+ is supplied to odd-numbered data lines DL_odd and a negative polarity green video signal G− is supplied to even-numbered data lines DL_even. Accordingly, of the pixel cells 110 in the second horizontal line, odd-numbered pixel cells 110 display green video corresponding to the negative polarity green video signal G− and the even-numbered pixel cells 110 display green video corresponding to the positive polarity green video signal G+. As such, video signals displayed on the pixel cells 110 in the first and second horizontal lines adjacent along a vertical direction have polarities different from each other.

At the third subperiod of the first horizontal period, in synchronization to supply of the gate-ON voltage Von to the third gate line GL3, of the first to $(m)^{th}$ data lines DL1 to DLm, a positive polarity blue video signal B+ is supplied to odd-numbered data lines DL_odd and a negative polarity blue video signal B− is supplied to even-numbered data lines DL_even. Accordingly, of the pixel cells 110 in the third horizontal line, odd-numbered pixel cells 110 display blue video corresponding to the positive polarity blue video signal B+ and the even-numbered pixel cells 110 display blue video corresponding to the negative polarity blue video signal B−. As such, video signals displayed on the pixel cells 110 in the second and third horizontal lines adjacent along a vertical direction have polarities different from each other.

As a result, during the first horizontal period, the red, green, and blue videos are displayed at the subperiods in sequence to mix the red, green, and blue videos to collectively display one color video. Similarly, the pixel cells in each of the horizontal periods display one color video in a method the same with the first horizontal period described above. Then, at the next frame, the polarity of the video signal is inverted as described above.

Accordingly, since the thin film transistors 112 on respective pixel cells 110 are arranged along the data lines DL on opposite sides thereof alternately, the video signals having a column inversion type polarity pattern supplied from the driving integrated circuit 130 to the liquid crystal panel 110 are displayed in a dot inversion type polarity pattern.

Figure 5:
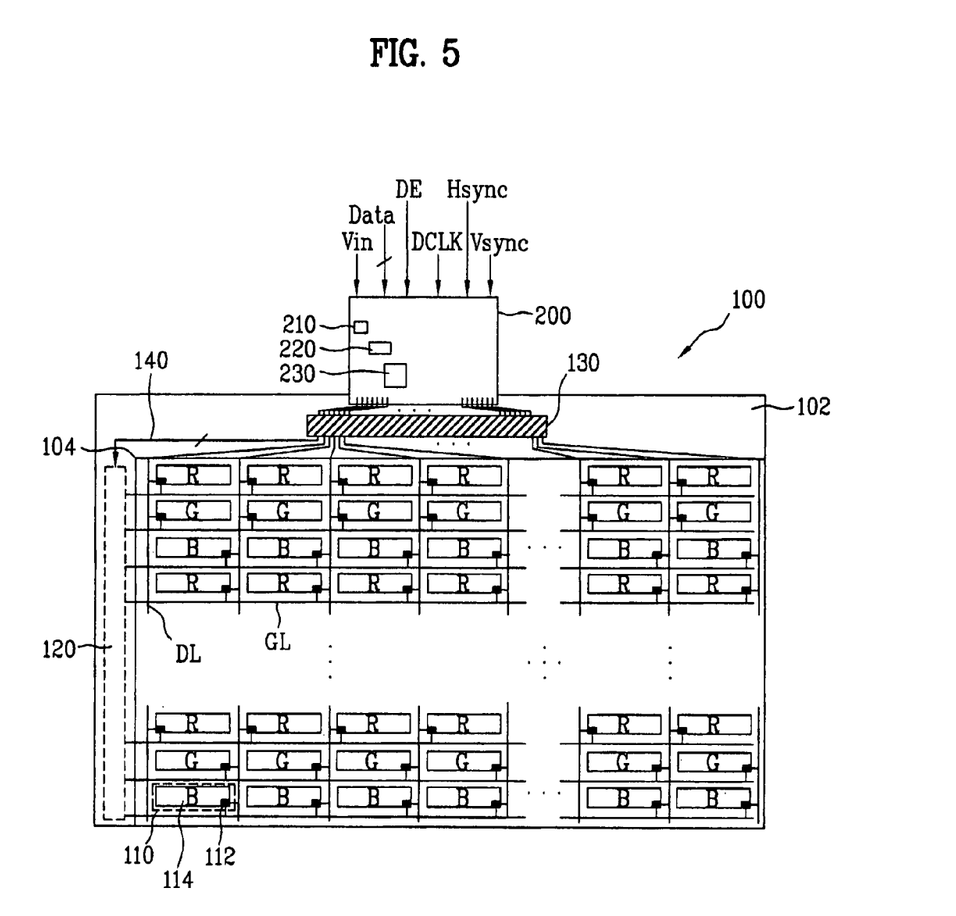
FIG. 5 is a schematic diagram illustrating a liquid crystal display device in accordance with a second embodiment of the invention.

FIG. 5 is a schematic diagram illustrating a liquid crystal display device in accordance with a second embodiment of the invention. As shown in FIG. 5, the liquid crystal display device of the second embodiment is similar to the first embodiment except for the arrangement of each of the pixel cells 110. Accordingly, the following explanation for the second embodiment will be focused on the arrangement of each of the pixel cells 110. The other portions of the liquid crystal display device in accordance with the second embodiment are similar to those of the first embodiment, as explained above.

As shown in FIG. 5, every two of pixel cells 110 arranged along the adjacent data lines DL on opposite sides thereof are alternately connected to one of the adjacent data lines DL. For example, the respective pixel cells 110 connected to (4k−3) (k is integers)$^{th}$ gate lines GL4k−3 are connected to immediately adjacent the data lines of left side; and the respective pixel cells 110 connected to (4k−2)$^{th}$ gate lines GL4k−2 are connected to immediately adjacent the data lines of left side. On the other hand, the respective pixel cells 110 connected to (4k−1)$^{th}$ gate lines GL4k−1 are connected to immediately adjacent the data lines of right side; and the respective pixel cells 110 connected to (4k)$^{th}$ gate lines GL4k are connected to immediately adjacent the data lines of right side.

The video signals outputted from integrated circuit 130 are supplied to the data lines connected to the respective pixel cells. At this time, the polarity of video signals is inverted in the data line unit and in at least one of the frame units. Accordingly, since every two of the thin film transistors 112 for the respective pixel cells 110 are arranged along the data lines DL on opposite sides thereof alternately, the video signals having a column inversion type polarity pattern supplied from the driving integrated circuit 130 to the liquid crystal panel 110 are displayed in a vertical two-dot inversion type polarity pattern. At this time, the polarity of the video signals by the two-dot inversion type polarity pattern is inverted in every two pixel cells unit and in the data line unit.

According to a second embodiment of the invention, the video signals supplied from the driving integrated circuit 130 are displayed in a vertical two-dot inversion type on the liquid crystal panel 110 to improve picture quality by preventing defects of dot-flicker. Also, according to a second embodiment of the invention, the polarity of the video signals supplied from the driving integrated circuit 130 is inverted in at least one of the frame units, to increase the charging time of the respective pixel cells 110 and to prevent the delay of video signals.

As mentioned above, the liquid crystal display device according to embodiments of the invention, the unit pixel cells composing the pixel cells having horizontal stripes structure are arranged in vertical direction, to thereby reducing the number of data lines by a third. Accordingly, the liquid crystal display device according to embodiments of the invention can be utilized for a large-sized liquid crystal display device as well as a small-sized liquid crystal display device.

As mentioned above, the liquid crystal display device according to embodiments of the invention, every one or two of the thin film transistors 112 on respective pixel cells 110 are arranged along the data lines DL on opposite sides thereof alternately. It is not limited to the above explanation. For example, every three of the thin film transistors 112 for the respective pixel cells 110 arranged along the adjacent data lines DL on opposite sides thereof can be alternately connected to one of the adjacent data lines DL.

Hence, the liquid crystal display device according to embodiments of the invention has the following advantages. First, the driving of the liquid crystal panel with one driving integrated circuit built in the liquid crystal panel reduces unit cost and minimizes a thickness of the liquid crystal display device. Second, the inversion of the polarity of the video signal in a data line unit and in a frame unit permits a reduction of power consumption. Third, the minimization of polarity change of the video signal provides a sufficient video signal charging time period and improves a picture quality. Fourth, the arrangement of the pixel cells along a horizontal direction permits a reduction in the number of data lines by up a third, to thereby utilize a large-sized liquid crystal display device as well as a small-sized liquid crystal display device. Fifth, the video signals having a column inversion type polarity pattern are displayed in a vertical two-dot inversion type, to thereby improve the picture quality by preventing defect such as dot-flicker. Sixth, the polarity of the video signals supplied from the driving integrated circuit is inverted in at least one of the frame units, to increase the charging time of the respective pixel cells 110 and to prevent the delay of the video signals, thereby improving the picture quality.

Also, according to an embodiment of the invention, the liquid crystal display device is driven in a row-inversion scheme to dot-invert the pixel electrodes therein. For example, based on the arrangement of pixel cells according to an embodiment of the invention, the liquid crystal display device is driven in a row-inversion scheme to achieve effects of an one-dot inversion driving scheme. Alternatively, based on the arrangement of pixel cells according to another embodiment of the invention, the liquid crystal display device is driven in a row-inversion scheme to achieve effects of a two-dot inversion driving scheme.

In addition, the driving of the liquid crystal panel only with one driving integrated circuit decreases a size of the flexible printed circuit and reduces unit cost of the flexible printed circuit. Further, the gate driver which drives the gate lines built in the liquid crystal panel eliminates the use of a gate driver integrated circuit, a gate flexible printed circuit, and a gate printed circuit board. Moreover, the manufacturing of the liquid crystal display device only with a liquid crystal panel fabrication process, driving integrated circuit mounting process, and a flexible printed circuit attachment process utilizes a simplified manufacturing process, to thereby minimizing defect ratio.

It will be apparent to those skilled in the art that various modifications and variations can be made in the liquid crystal display device of embodiments of the invention without departing from the spirit or scope of the invention. Thus, it is intended that embodiments of the invention cover the modifications and variations of this invention provided they come within the scope of the appended claims and their equivalents.

What is claimed is:

1. A liquid crystal display device, comprising:
   a plurality of data lines of a liquid crystal panel including a first data line and a second data line arranged substantially parallel to each other;
   a plurality of gate lines of the liquid crystal panel including a first gate line, a second gate line, and a third gate line arranged substantially parallel to one another, the gate lines crossing the data lines;
   a plurality of sub-pixels of the liquid crystal panel defined by the crossing the gate lines and the data lines and having red, green, and blue of three colors arranged repeatedly in a data line direction and the same colors arranged in a gate line direction;
   a gate built-in circuit driving the gate lines formed in the liquid crystal panel, the gate built-in circuit sequentially driving the first, second, and third gate lines in a horizontal period; and
   a driving integrated circuit driving the gate built-in circuit and supplying video signals inverted in a data line unit and a frame unit to the data lines,
   wherein the driving integrated circuit divides one horizontal period into a first to third sub-periods, and aligns the data signals of the one horizontal period into red, green and blue data corresponding to each of the sub-periods,
   wherein the driving integrated circuit comprises:
      a signal relay unit for relaying and synchronizing data signals from a external driving system,
      a first power generating unit for generating a first power,
      a second power generating unit for generating a second power using the first power,
      a clock generating unit generating clocks to drive the first and second power generating units,
      a level setting unit setting voltage level of the first power supplied from the first power generating unit,
      a common voltage generating unit for generating a common voltage supplied to a common electrode using the second power,
      a signal control unit aligning the data signals from the signal relay unit and controlling the driving integrated circuit,
      a control signal generating unit generating data control signals and gate driving signals using the synchronizing signals from the signal control unit,
      a pull-up circuit for pulling up voltage levels of the gate driving signals using the second power and supplying the gate driving signals pulled up to the gate built-in circuit,
      a gray scale voltage generating unit generating a plurality of gray scale voltages using the first power, and
      a data converting unit converting aligned data signals supplied from the signal control unit using the plurality of gray scale voltages into video signals,
   wherein the signal control unit realigns the red data aligned into odd-numbered red data to be supplied to odd-numbered data lines, and the red data aligned into even-numbered red data to be supplied to even-numbered data lines during a first subperiod of an one horizontal period,
   the signal control unit realigns the green data aligned into odd-numbered green data to be supplied to even-numbered data lines, and the green data aligned into even-numbered green data to be supplied to odd-numbered data lines during a second subperiod of the one horizontal period, and
   wherein the signal control unit realigns the blue data aligned into odd-numbered blue data to be supplied to odd-numbered data lines, and the blue data aligned into even-numbered blue data to be supplied to even-numbered data lines during a third subperiod of the one horizontal period.

2. The device of claim 1, wherein:
   each of the sub-pixels includes a switching element; and
   the switching elements for the sub-pixels arranged between the first and second data lines are connected alternatively to one of the first and second data lines.

3. The device of claim 1, wherein:
   each of the sub-pixels includes a switching element; and
   every two of the switching elements for the sub-pixels arranged between the first and second data lines are connected alternatively to one of the first and second data lines.

4. The device of claim 1, wherein the sub-pixels are dot-inverted or two-dot-inverted.

* * * * *